May 25, 1954 G. B. HOUCK, JR 2,679,621

SATURABLE TRANSFORMER AMPLIFIER

Filed Aug. 6, 1952

INVENTOR.
GLADDEN B. HOUCK, JR.

BY

ATTORNEY.

Patented May 25, 1954

2,679,621

UNITED STATES PATENT OFFICE 2,679,621

SATURABLE TRANSFORMER AMPLIFIER

Gladden B. Houck, Jr., Port Chester, N. Y., assignor to General Precision Laboratory Incorporated, a corporation of New York Application August 6, 1952, Serial No. 302,955

6 Claims. (Cl. 318—29)

This invention relates to saturable transformer amplifiers and more specifically to circuits including such amplifiers for producing an output voltage having a phase differing from that of the voltage applied to the amplifier.

Saturable transformer amplifiers are employed in circuits for control of small two-phase motors, and these circuits are frequently used in servomechanisms. Such amplifiers are also employed to control polyphase motors of larger size, and can be employed to generate polyphase power, particularly two-phase power, from single-phase power. The present invention is applicable to saturable transformer amplifiers utilized for any purpose.

Saturable transformer amplifiers are characterized by ease of control. In two-phase applications the output of the amplifier is required to be single phase having its phase shifted ideally by 90° from the phase of the alternating power applied to the amplifier. In servo and other control applications it is additionally required that the output voltage be continuously variable from a positive maximum sense through zero to a negative maximum sense, which is to say that the output phase changes sense when the voltage passes through zero. In such applications the input to the transformer control winding is preferably a direct-current differential voltage that is controllable in magnitude from a positive maximum through zero to an equal negative maximum.

The saturable transformer amplifier for such control uses is ordinarily preceded by an electronic amplifier to enable control to be exercised by small signals.

In order to operate a polyphase motor or other polyphase apparatus from a saturable transformer amplifier, a suitable phase shift must be introduced by some means. The saturable transformer does not of itself introduce appropriate phase shift, but it does offer a very satisfactory method of accurate control when used with condensers or other phase shifting devices. The condensers may be employed in connection with one or more of the motor windings, and in the past it has been generally assumed that the resulting polyphase operation occurs because of a simple shift of phase at one or more windings of the motor. However, this is an erroneous oversimplification and it will be shown that when a saturable transformer is employed, capacitance is required in the transformer primary circuit and not solely at the motor windings as heretofore supposed, and that when capacitance is so applied more efficient operation results. In addition, when step-down saturable transformers are employed, smaller components can be used.

The general purpose, then, of this invention is to provide an improved circuit including a saturable transformer and a condenser for the production of an output voltage having a phase differing by other than 180° from the phase of the alternating power input voltage.

Another purpose of this invention is to provide a circuit of superior efficiency for the conversion of single-phase electrical power to two-phase electrical power.

Still another purpose of this invention is to provide an improved servomechanism circuit containing a saturable transformer amplifier.

A further understanding of this invention may be secured from the detailed description and the accompanying drawings in which.

Figure 1:
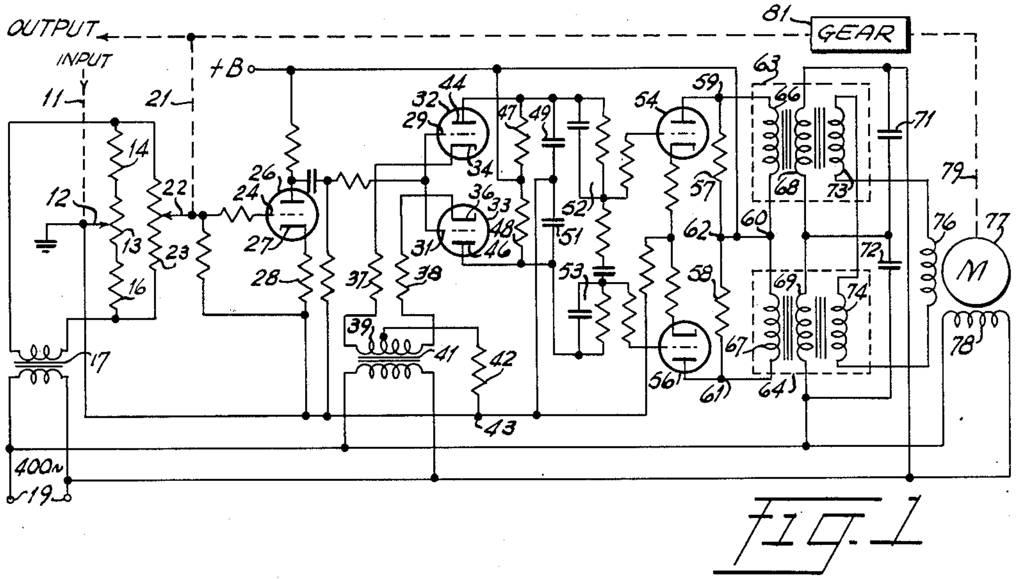
Figure 1 is the schematic circuit of a servomechanism employing a saturable transformer amplifier final stage, and embodying this invention.

Referring now to Fig. 1, an input signal having the nature of a mechanical step displacement is applied at 11 to a slider 12. This input signal is in general partly neutralized by a fed back mechanical signal having the opposite sense, so that the difference is an electrical error signal which is suitably amplified and applied through a differential electronic amplifier stage to a final amplifier stage of the magnetic type. The input step signal at 11 may have either positive or negative direction or sense, as well as any selected amplitude within limits. It is therefore necessary to provide an amplifier between this point and the magnetic amplifier stage that responds to both positive and negative magnitudes, and to employ a suitable error signal. Various known arrangements may be utilized to accomplish this end and the invention is not dependent upon the use of any particular arrangement. For example, the electrical error signal may consist of any desired alternating or direct magnitude which varies between values of opposite senses, i. e., signals of one phase or the opposite phase in the case of alternating magnitudes and positive and negative signals in the case of direct current signals. For the purpose of this description an alternating electrical voltage error signal is selected, values of opposite senses of such a signal being represented by opposite phases.

The slider 12 is grounded and engages a voltage divider 13 connected through limiting resistors 14 and 16 and isolation transformer 17 to a source of 400-cycle power applied at terminals 19. The feedback signal is secured through a mechanical connection 21 which actuates the slider 22 of a voltage divider 23, the divider 23 being also connected across the 400-cycle transformer 17 secondary winding. The slider 22 is connected to the control grid 24 of a triode amplifier 26 having its cathode 27 grounded through resistor 28. Any alternating voltage difference between the sliders 12 and 22 thus appears as a voltage difference between the grid 24 and ground potential, having a selected phase and amplitude representative of the relative positions of the sliders 12 and 22. When the two sliders are at exactly the same level there is no potential difference between them, the potential of slider 22 is that of ground, and there is no alternating voltage signal applied to the grid 24. Thus an error voltage is applied to the grid 24 representing by its sense the positioning error of slider 22 relative to slider 12. This error voltage is amplified by the triode 26 and applied in parallel to the control grids 29 and 31 of a differential phase-sensitive detector comprising triodes 32 and 33. These triodes are caused to be phase-sensitive by the application of an alternating potential to their cathodes 34 and 36 through resistors 37 and 38, the alternating potential being secured from the secondary winding 39 of a transformer 41 excited from the 400-cycle supply terminals 19. The secondary winding 39 is provided with a center tap connected through resistor 42 to the grounded negative terminal 43 of a source of direct-current plate voltage, while the plates 44 and 46 are connected in parallel through resistors 47 and 48 to the positive terminal of the same plate voltage. Thus a 400-cycle potential is super-imposed on cathodes 34 and 36, in addition to the direct-current potential secured from the plate supply.

In operation, in the absence of an input signal equal average currents flow in triodes 32 and 33 but flow during opposite half cycles of the phasing voltage. Upon application of a signal, the currents and therefore the plate output voltages are unbalanced roughly in proportion to signal magnitude and corresponding in sense to the signal sense.

These plate output voltages are somewhat smoothed by condensers 49 and 51, their transient response being improved by the filter circuits 52 and 53. The resulting voltages are applied to a conventional direct-coupled differential amplifier stage comprising triodes 54 and 56, energized in parallel through plate resistors 57 and 58. In differential operation the positive potentials at plate terminals 59 and 61 relative to the potential of the positive supply voltage terminal 62 vary reciprocally in accordance with the magnitude of the amplifier input signal, the sense of the signal determining whether the potential at terminal 59 or 61 is the higher.

Two similar saturable transformers 63 and 64 are connected with their control windings 66 and 67 in series and with the common junction 60 connected to the plate potential supply terminal 62. The other control winding terminals are connected to the plate terminals 59 and 61 respectively. The transformer primary windings 68 and 69 are connected in series across the 400-cycle power terminals 19. A condenser 71 is connected in parallel with one primary winding 68 and a second similar condenser 72 is connected in parallel with the other primary winding 69. The transformer secondary windings 73 and 74 are also connected in series but are opposed in polarity. One winding 76 of a two-phase motor 77 is connected in series with both transformer secondary windings 73 and 74. The other two-phase winding 78 of motor 77 is connected across the 400-cycle power terminals 19. The motor shaft 79 is connected through suitable gearing 81 and shaft 21 to the feedback slider 22, the sense being degenerative for conventional servo operation.

Figure 2:
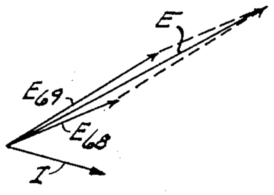
Figures 2, 3, 4 and 5 are vector diagrams illustrating the operation of the invention.

In operation let it be assumed that the current through control winding 66 may vary from 8 ma. to zero while the current through the other control winding 67 varies reciprocally from zero to 8 ma., the sum of these currents being at any time equal to 8 ma., these as well as the following figures being assumed merely as examples. The impedances of the primary windings 68 and 69 are caused to vary by variation of the current through the control windings, a control winding current of 8 ma. causing a low impedance in the associated primary winding while zero control current permits the associated primary winding to have higher impedance. When the 400-cycle potential of the supply terminals is applied across these primary windings in series, assuming that the secondary windings are open and that the condensers 71 and 72 are absent, the potential divides across the primary windings, and each has a potential drop and phase in accordance with the usual rule for the addition of two inductive impedance voltage drops in series when no magnetic coupling exists between them. This is illustrated in the vector diagram of Fig. 2, in which I represents the series current, $E_{68}$ represents the potential drop across winding 68, $E_{69}$ represents the potential drop across 69, and E represents the vector sum of these potential drops equalling the line voltage. In this diagram the vectors $E_{68}$ and $E_{69}$ differ in magnitude and direction because of the incidental differences of the primary windings in resistance and because of the differences in inductive reactance caused by the control windings.

Figure 3:
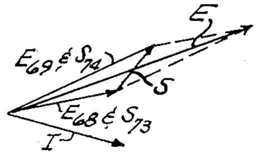

If the secondary circuit be closed, the conditions illustrated in Fig. 3 obtain. The line S represents the secondary load voltage, being the difference of the secondary voltages, it being assumed that the transformers each have unity ratio and that the secondary voltages $S_{73}$ and $S_{74}$ are, diagrammatically, in phase with their respective primary voltages. This secondary voltage is small and is by no means at 90° to the line voltage E.

Figure 4:
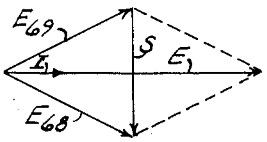

The condensers 71 and 72 are equal in capacitance and are of such size as to "tune" the circuit inductance at the frequency employed. Their addition thus rotates the voltage vectors $E_{68}$, $E_{69}$ and E relative to I in a clockwise direction so that under most conditions leading current is drawn by one of the shunted primary windings. This is indicated in Fig. 4, in which the voltage $E_{68}$ now leads the resultant E. The primary current I and line voltage E have been brought into phase. In the same figure the difference of vectors $E_{68}$ and $E_{69}$ is S, and represents the load voltage in magnitude and phase relative to the line voltage E, this voltage being large and at very nearly 90° phase relation to the voltage of motor winding 78. If the effective resistance drops in both primary windings are exactly the same, and enough capacitance is employed to cause one primary voltage to lag the current while the other leads, at a specific control ratio, then the secondary load voltage is exactly in quadrature with the line voltage. This is usually the optimum condition for two-phase motor operation.

The condition of Fig. 4 may be described simply as a case in which, from the standpoint of the line terminals, one of the primary windings shunted by its condenser preponderates in inductance and appears as inductance in its effect, while the other shunted winding preponderates in capacitance and so appears as capacitance, the total effects therefore, being that of an inductance and capacitance in series, the values being such as to be in approximate resonance at the frequency used. For example, if more plate current flows through tube 54 than through tube 56, the net reactance of this winding 68 and its associated condenser 71 is capacitive and its voltage lags its current.

Figure 5:
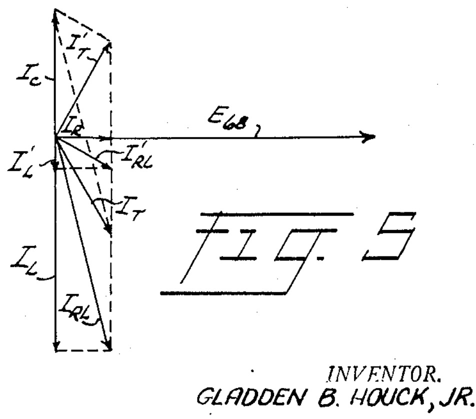

It is a remarkable fact that in this circuit, although changes in the impedance ratio of the primary windings produce only relatively small changes in voltage drop, on the order of 10% maximum, they produce very great changes in phase. This phase sensitivity almost completely accounts for the great power gain of such a magnetic amplifier stage. This is clearly shown in Fig. 5 which is a diagram of the vector relations in the single combination of primary winding 68 and shunting condenser 71. The voltage $E_{68}$ across winding 68 and condenser 71 is in phase with the resistive current $I_R$ and when the magnitude of the current in the control winding 66 causes the inductance of winding 68 to be small its inductive current is $I_L$, so that the total current through the coil is $I_{RL}$. The condenser current is $I_C$, assuming no resistance loss, and the vector sum of $I_{RL}$ and $I_C$ is $I_T$, considerably lagging $E_{68}$. When the inductive current is reduced to $I_L'$ by reduction of current flow in the control winding, the total coil current is $I_{RL}'$ and the vector sum of this current and $I_C$ is $I_T'$, which leads $E_{68}$ considerably. The phase angle between $I_T$ and $I_T'$ is more than 90°, but the scalar magnitudes of $I_T$ and $I_T'$ are the same.

It follows that in the circuit of Fig. 1 including both transformers, as the differential control voltage is varied from the maximum value in one sense through zero to the maximum value in the opposite sense, the load potential is varied from a maximum in one sense having a phase relation of 90° to the line potential, through zero to a maximum in the opposite sense having a relation of 270° to the line potential. Application of these potentials to the motor winding 76 operate motor 77 from a maximum speed in one direction through zero to a maximum speed in the opposite direction. Operation of the motor moves the slider 22, as before mentioned, the direction of motion always being that which tends to eliminate the voltage difference between it and slider 12.

In these examples and descriptions it is to be understood that in the operating circuit, when the inductance or impedance of a primary coil is mentioned, it is meant the inductance or impedance as presented to the power circuit applied to its terminals, and is to be understood as including the inductance of its secondary coil and the impedance of the entire secondary circuit as reflected through the secondary coil to it, and as also including leakage inductance.

While it is possible to place the circuit capacitance elsewhere than as described and shown at 71 and 72 it is obvious that in so doing a loss must be suffered, since the foregoing analysis establishes that the condensers are positioned at the exact positions in the circuit where they are required. When they are placed elsewhere their reactive currents must be transmitted by other components to the transformer primary windings, with accompanying transmission losses.

What is claimed is:

1. A magnetic amplifier comprising, a pair of saturable transformers each of which includes a primary, secondary and control winding, circuit means applying differentially variable control currents to said control windings, a source of alternating current having said primary windings connected in series aiding relation thereacross, a load circuit having said secondary windings connected in series opposing relation thereacross, and means for tuning each of said primary windings to resonance at the frequency of said source and the apparent impedance of said primary windings when equal and opposite currents are imposed on said control windings.

2. A magnetic amplifier comprising, a pair of saturable transformers each of which includes a primary, secondary and control winding, circuit means applying differentially variable control currents to said control windings, a source of alternating current having said primary windings connected thereacross in series aiding relation, a load circuit having said secondary windings connected thereacross in series opposing relation, a pair of condensers each of which is connected in shunt to a respective primary winding, said condensers having equal capacitances of a value such that each of said primary windings is tuned to resonance at the frequency of said source and at an apparent impedance value of said primary windings determined by the condition of equal and opposite current flow in said control windings.

3. A saturable transformer amplifier having the phase of its output shifted with respect to the phase of its input comprising, a plurality of saturable transformers each having a primary, secondary and control winding, equal capacitances each connected in shunt to a respective primary winding, circuit means for connecting said primary windings in series aiding to a source of alternating current power having a selected phase, load terminals, circuit means for connecting said secondary windings in paired series opposition to said load terminals, and means for applying differential control currents to said control windings.

4. A phase-changing amplifier having the phase of its output differing by one-quarter phase from the phase of its input comprising, a pair of saturable transformers each having a primary, secondary and control winding, equal capacitances each connected in shunt to a respective primary winding, a source of alternating current power having a selected phase, circuit means for connecting both of said primary windings in series aiding to said source, means for applying differential control currents to said control windings, and circuit means for connecting both of said secondary windings in series opposition, whereby the voltage across secondary windings is in phase quadrature to said selected phase quadrature to said selected phase and the voltage magnitude is representative of said differential control current.

5. A two-phase motor control comprising, a two-phase motor having field windings in spaced quadrature relation, a source of alternating current connected to one of said windings, a pair of saturable transformers each comprising a primary, secondary and control winding, two equal capacitances each connected in shunt to a respective primary winding, circuit means connecting both of said primary windings to said source in series aiding relation means for applying differential control current to said control windings, and circuit means connecting both of said secondary windings in series opposition and in series with the other of said motor windings, whereby the voltage thereacross is in phase quadrature relative to voltage across said one winding.

6. A servomechanism comprising, a two-phase motor having a pair of field windings positioned in space quadrature a source of alternating current power connected to one of said windings, a pair of saturable transformers each comprising a primary, secondary and control winding, two equal capacitances each connected in shunt to a respective primary winding, circuit means connecting both of said primary windings to said source in series aiding relation, circuit means connecting both of said secondary windings in series opposition and in series with the other of said motor windings, electronic amplifier means for applying differential direct control currents to said two control windings, means for generating an input signal, means for comparing said input signal with a signal dependent on the rotational displacement of said motor and for deriving an electrical error signal therefrom, and means for applying said error signal to the input of said electronic amplifier means.

References Cited in the file of this patent

UNITED STATES PATENTS

| Number | Name | Date |
|---|---|---|
| 2,164,383 | Burton | July 4, 1939 |
| 2,450,084 | Emerson | Sept. 28, 1948 |
| 2,493,605 | Warsher | Jan. 3, 1950 |
| 2,531,682 | Hornfeck | Nov. 28, 1950 |
| 2,545,343 | Conviser | Mar. 13, 1951 |
| 2,559,513 | Palmer | July 3, 1951 |